C. V. ROTE.
BRAKE SHOE MECHANISM.
APPLICATION FILED DEC. 21, 1916.
1,250,514.
Patented Dec. 18, 1917.
4 SHEETS—SHEET 4.
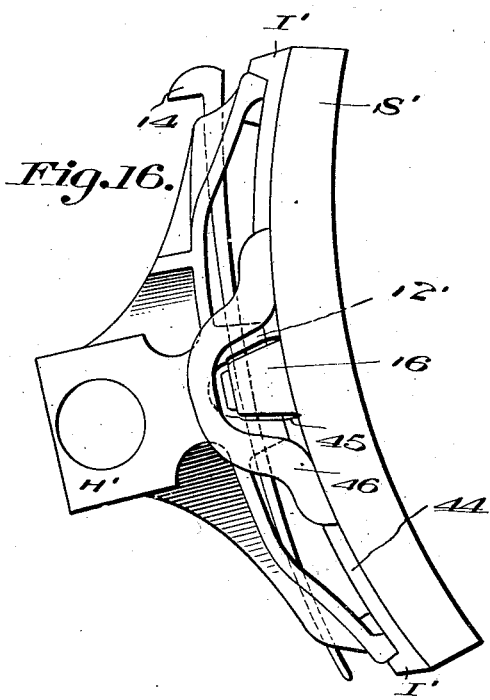
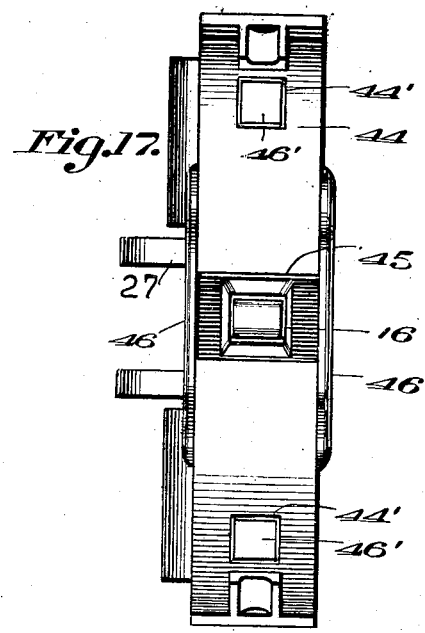
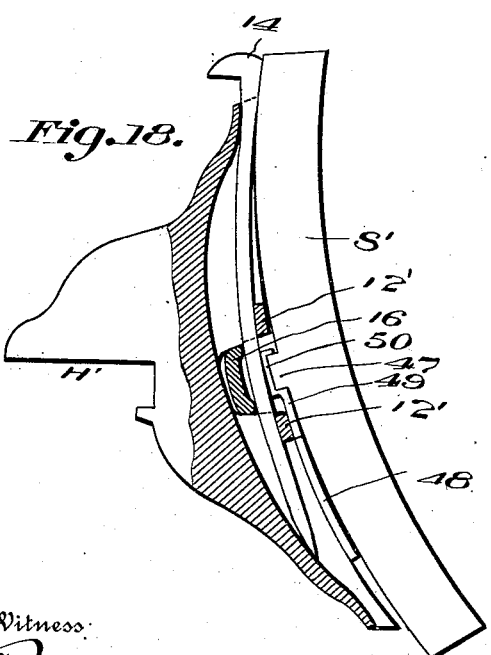
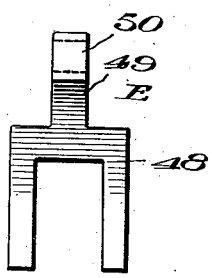
Inventor
Charles V. Rote
Witness
Philip E. Barnes
By
Attorney

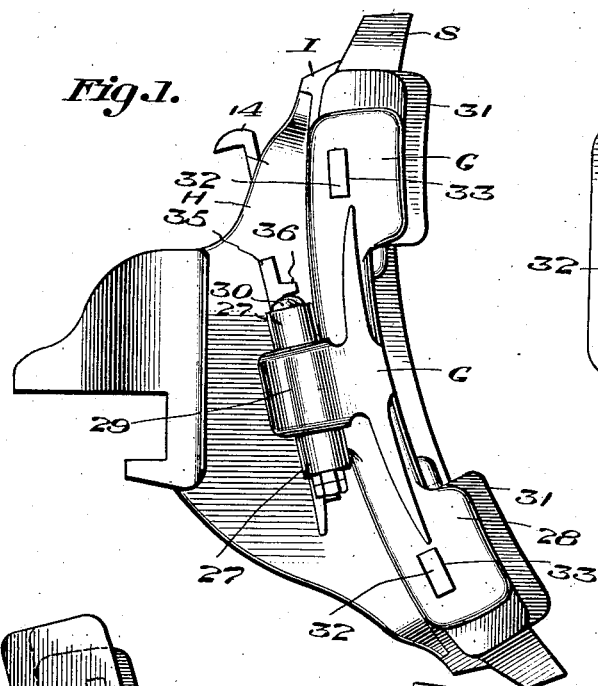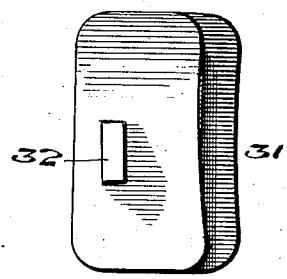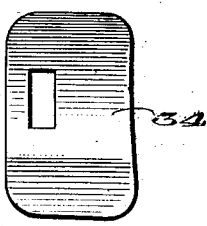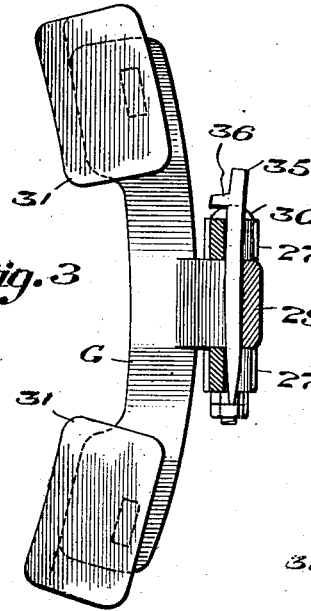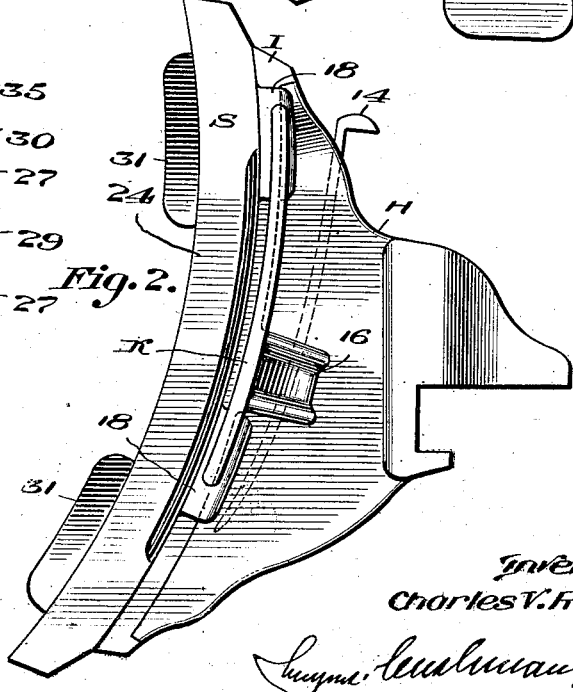

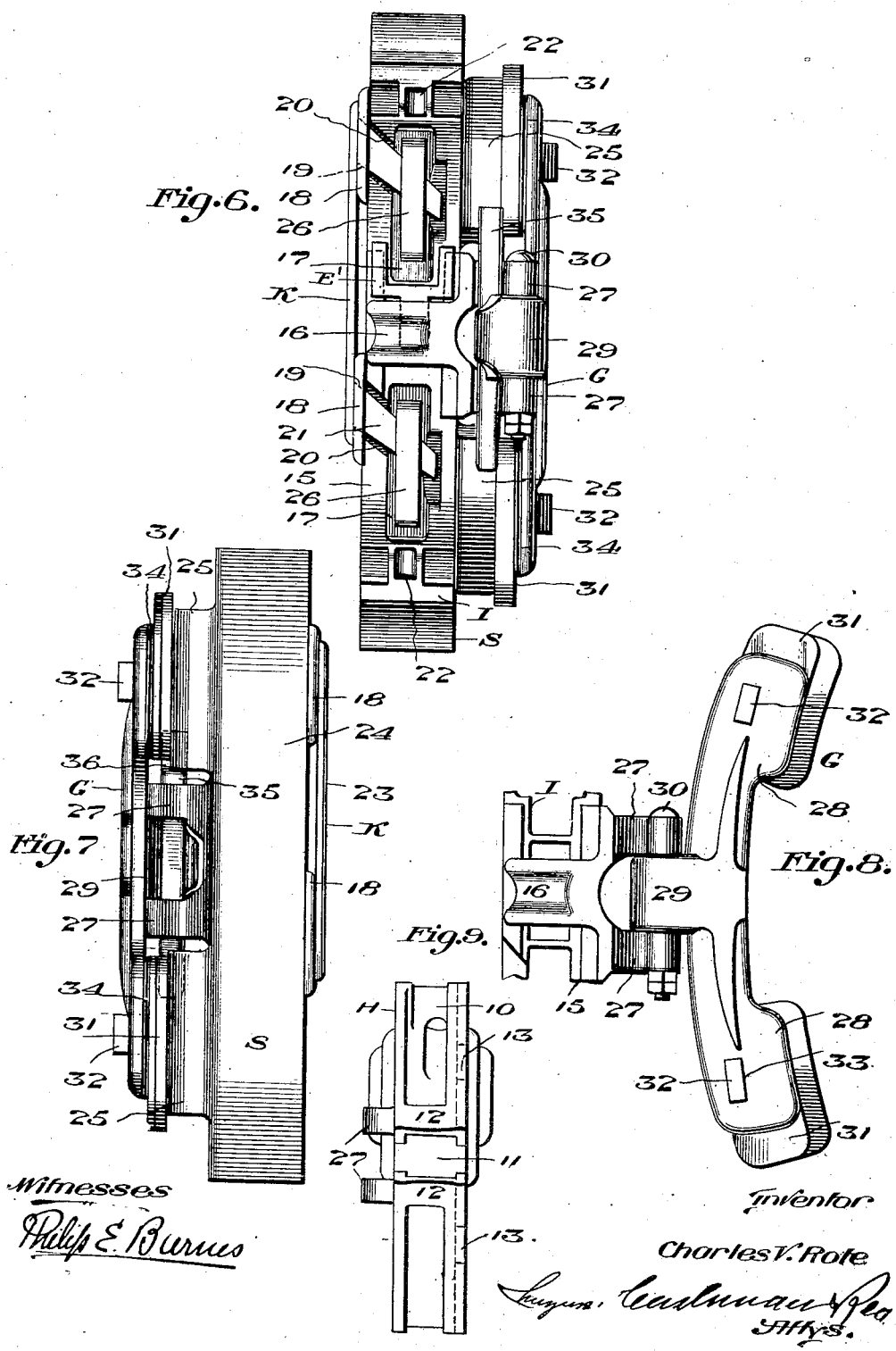

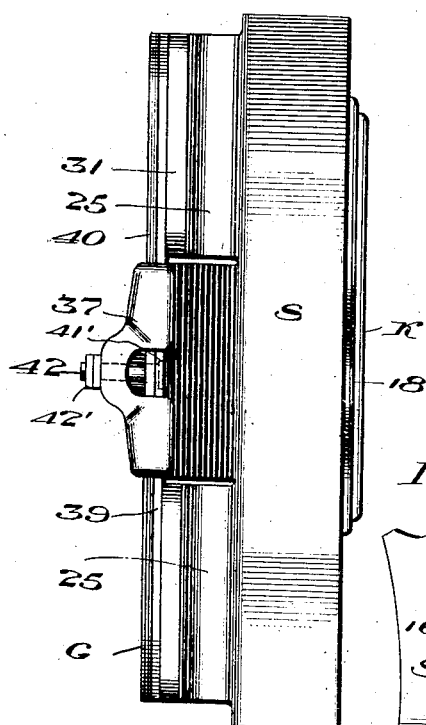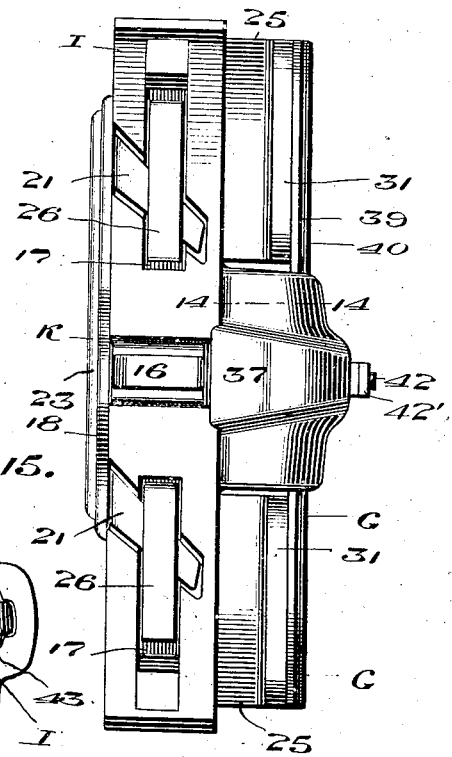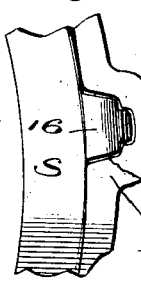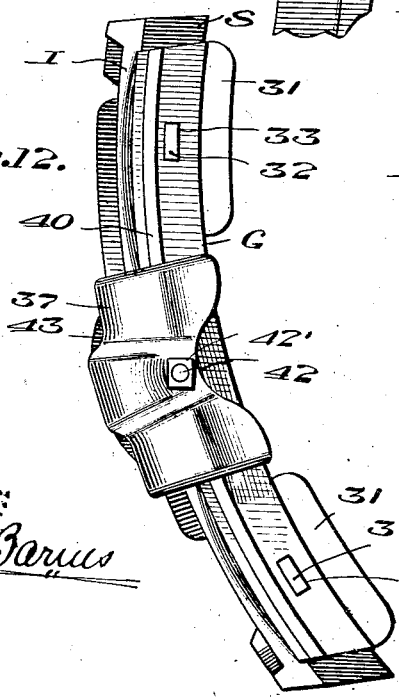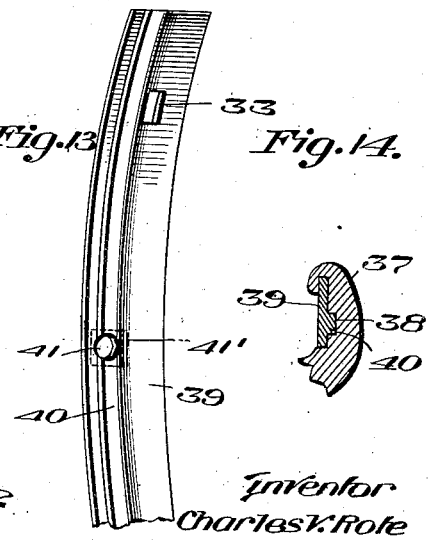

UNITED STATES PATENT OFFICE.

CHARLES V. ROTE, OF LANCASTER, PENNSYLVANIA, ASSIGNOR TO C. V. ROTE BRAKE SHOE CO., OF LANCASTER, PENNSYLVANIA, A CORPORATION OF DELAWARE.

BRAKE-SHOE MECHANISM.

1,250,514.   Specification of Letters Patent.   Patented Dec. 18, 1917.

Application filed December 21, 1916.   Serial No. 138,205.

*To all whom it may concern:*

Be it known that I, CHARLES V. ROTE, a citizen of the United States, residing at Lancaster, in the county of Lancaster and State of Pennsylvania, have invented new and useful Improvements in Brake-Shoe Mechanism, of which the following is a specification.

This invention relates to brake shoe mechanism and has as one of its objects to provide means for retaining brake shoes in engagement with and against lateral displacement relative to the tread of the wheel of a car to which the shoe is connected.
As now usually constructed, a brake shoe is provided with a relatively wide surface adapted to engage the tread of the car wheel, and a flange or flanges to engage the flange of the wheel, the shoe flanges being suitably curved or channeled to retain the shoe within the confines of the periphery of the car wheel. The brake shoe mechanism is carried by a hanger or brake beam which is allowed lateral and to-and-fro movements.
Not infrequently the flange of the wheel fails to correctly fit or engage in the channel of the shoe flange, the result being that the outer retaining edge of the shoe flange is worn away, and there then being no means for retaining the shoe and wheel in the correct relative positions, it is necessary to scrap the shoe which may be only partly worn. Also, upon partial rotation of the car trucks, the wheels are sometimes withdrawn from alinement with the brake shoes. In addition to the likelihood of an accident resulting when a brake shoe moves out of alinement with the car wheel (for then the brakes cannot be properly applied) damage is often done to the brake shoes themselves, as frequently the tread of a shoe is brought into engagement with a flange of the wheel.

In accordance with my invention, I provide the brake shoe mechanism with a guard which prevents lateral displacement of the shoe relative to the wheel which it should engage. The construction is such that the wearing parts of the guard may be readily removed for purposes of renewal or adjustment, and the improved guard does not interfere with the ready removal of the shoe from its supporting member, such as the brake head. When my improved guard is employed, if it should occur that the flange of the shoe should be worn through, or the outer retaining edge thereof be worn away, it would not be necessary to scrap the shoe when it is only partially worn for the improved guard would engage the face of the wheel and prevent lateral displacement between the wheel and the brake shoe.

In the old form of brake shoe it has been customary to swell or make the back of the shoe flanges transversely convex so that these flanges are substantially the same thickness as the brake shoe, but this is not necessary with my construction, for the flanges may be worn away and yet the shoe cannot become displaced relative to the wheel. It will thus be seen that with my improved guard the thickness of the brake shoe flanges may be reduced and an economy in the amount of metal used in the flanges is obtained.

In practice, it is often found that the brake head is not properly hung, in that its front face is eccentric to the periphery of the car wheel. When this occurs, a brake shoe mounted on the front face of the head is not concentric to the periphery of the wheel as it should be, but one end of the shoe is in engagement with the wheel, while the other end is not, and the result is that one end of the shoe is worn through before the other end. It is an object of this invention to provide means for blocking up the shoe so that its wearing face will initially engage the periphery of the wheel throughout its length although the front face of the head, or other brake shoe supporting member, is eccentric to the periphery of the wheel.

In Letters Patent, No. 1,213,419 granted to me January 23, 1917, I have described an improved intermediate member adapted to be interposed between the brake shoe and head, and the present application, as to this feature constitutes a continuation of the application on which my aforesaid patent was granted.

The above and other objects of my invention are obtained in the structure described in the following specification and illustrated in the accompanying drawings.

In said drawings,—

Figure 1 is an inside elevational view of my improved brake shoe mechanism.

Fig. 2 is an outside view thereof.

Fig. 3 is an inside elevational view of my improved guard, the knuckle for securing the guard to the supporting member being shown in cross-section.

Fig. 4 is a face view of a wearing block adapted to be carried by the guard and engage the inner face of the car wheel.

Fig. 5 is a face view of a shim plate or washer which is adapted to be inserted between the wearing block, shown in Fig. 4, and the guard plate which carries said block.

Fig. 6 is a rear elevational view of an intermediate member carrying the guard and having a brake shoe secured thereon.

Fig. 7 is a front elevational view of the assembled brake shoe mechanism shown in Fig. 6.

Fig. 8 is an elevational view of my improved guard mechanism, the same being disclosed as secured to an intermediate member and the ends of the latter being broken away.

Fig. 9 is a front view of a brake head the same being disclosed as having suitable pivot posts or projections to permit the guard to be connected directly to the head, and this figure is on a somewhat smaller scale.

Fig. 10 is a rear elevational view of the intermediate member having a shoe secured thereon, and showing another embodiment of my guard device.

Fig. 11 is a front elevational view of the mechanism shown in Fig. 10.

Fig. 12 is an inside elevational view of the mechanism shown in Fig. 10.

Fig. 13 is an elevational view of the guard plate shown applied to the shoe in Fig. 12.

Fig. 14 is a partial sectional view taken on the line 14—14, Fig. 10.

Fig. 15 is a side elevation of the central portion of an assembled intermediate member and brake shoe, and discloses the manner of arching the former to permit ready insertion of the shoe into place thereon.

Fig. 16 is a side elevation of an assembled brake-head, intermediate member, and shoe, the shoe being of the usual form having a single central keeper, and a single key being provided for locking both the intermediate member and shoe to the head.

Fig. 17 is a rear view of the intermediate member shown in Fig. 16 with a shoe mounted thereon.

Fig. 18 is a side view of a brake head and shoe partly in elevation, and partly in section, showing my improved equalizing or shim plate in position.

Fig. 19 is a rear elevational view of the shim plate for blocking up the brake shoe.

Referring to the drawings, wherein like numerals represent like parts in the several views, H designates a brake head, I an intermediate member which is secured to the head, S a brake shoe which is secured to the intermediate member, and G my improved guard which, in Fig. 9, is connected directly to the brake head, and in the remaining figures to the intermediate member.

The brake head H as clearly shown in Fig. 9, comprises a hollow body or shell, the front wall of which is provided with a pair of spaced apart openings 10 adapted to receive lugs or keepers of the brake shoe hereinafter described, when it is desired to connect the shoe directly to the brake head. Centrally of the head is a transverse recess 11 which preferably extends throughout the width of the head, and between the openings 10 and recess 11 are webs 12 which serve as keepers through which a retaining key 14, suitably tapered, is adapted to pass, the head having in its top wall an opening to receive said key. Extending through the outer wall of the head and spaced apart to correspond to the slots 10 are elongated apertures 13.

The intermediate member I comprises a plate 15 having a central keeper or apertured lug 16 adapted to be received between the keepers 12 of the brake head and through which the key 14 may pass to lock the intermediate member to the head. The plate 15 has a pair of longitudinally extending openings 17 adapted to receive the lugs or keepers of the brake shoe S, and along one side of the intermediate member is an upstanding flange 18 having a pair of elongated apertures 19 spaced apart to correspond to the longitudinal openings 17 in the body portion of the intermediate member. Extending inwardly of the intermediate member and preferably obliquely from the elongated apertures 19 are grooves 20 which constitute guide-ways adapted to receive the blades 21 of the key member K. The intermediate member I is also provided, adjacent its ends, with lugs or seats 22, which engage between the usual bifurcated ends of the brake head H, but, of course, these lugs may be dispensed with if desired.

The key K which locks the brake shoe S to the intermediate member I, or to the brake head H, comprises a handle portion 23, suitably curved to correspond to the curvature of the brake shoe, and blades 21 which extend obliquely from the opposite ends of the handle 23.

The shoe S comprises a body portion 24 having, along one side, wheel-flange engaging flanges 25 which on their front faces are curved inwardly so as to provide channels which receive the flange of the car wheel. Upon the rear or convex face of the brake shoe are a pair of longitudinally-extending spaced-apart keepers 26 which engage in the openings 17 in the body portion of the intermediate member I and which, when in this position, are adapted to be secured to the intermediate member by the key member K in the manner shown in Fig. 6.

From the foregoing description of the brake head, intermediate member and brake shoe, it will be seen that when assembling these parts, the intermediate member I is positioned on the front face of the brake head H with the central keeper 16 between the keepers 12 of the head, and as the central recess 11 is open at its ends, the shoe may be inserted transversely of the head, as the clearance between the front face of the head and the periphery of the car wheel, when the head is in position is relatively small. The key 14 is inserted into the head and projects through the keepers 12 and 16. The brake shoe S is positioned on the front face of the intermediate member I with the lugs 26 of the shoe protruding through the openings 17 of the intermediate member and the blades 21 of the key member K are then inserted in the elongated apertures 19 in the flange 18 of the intermediate member, and these blades extend inwardly into the key-ways 20 and through the keepers 26 of the shoe.

If desired the improved brake shoe S may be secured directly to the brake head H and the intermediate member I may be dispensed with. In this case, the shoe S is placed directly against the front face of the brake head with the lugs or keepers 26 engaging in the elongated openings 10, and the key member K is then inserted in place with the blades 21 engaging in the elongated apertures 13 and the keyways in the keepers 26.

By providing an intermediate member I, such as above described, it is possible to use my improved brake shoe on the old form of brake head, it being merely necessary to attach the intermediate member on the old form of brake head, and then secure the shoe to the face of the intermediate member. The intermediate member may be made at a relatively low cost, and should it occur that through negligence or inadvertence the brake shoe secured thereon should be worn through, and the intermediate member thus be brought into engagement with the periphery of the car wheel so that the intermediate member would be damaged, the cost of replacing the intermediate member would be slight. Thus the brake shoe may be worn away to a greater extent than has heretofore been permitted, for, heretofore, the brake shoe has been removed and scrapped long before it is totally worn through for fear that the brake head, which is relatively costly, would be damaged.

Referring now to my improved guard G, and more particularly to the embodiment shown in Figs. 1 to 9, it will be noted that in Figs. 1 to 8, the intermediate member is provided with a pair of centrally located spaced-apart posts 27, while in Fig. 9 these posts are secured directly to the brake head. It is to be understood that when my improved intermediate member is not to be used, the brake head is adapted to carry my improved guard.

Pivoted, for outwardly swinging movement, to the supporting member comprising either the intermediate member, or brake head H, is a guard plate 28 having a centrally disposed hooked projection 29 which is adapted to be positioned between the posts 27, the posts 27 and the hooked projection 29 having suitable openings which are adapted to register to receive a pivot member 30, the pivoted member, in the present instance, being in the form of a bolt. The guard plate 28 is adapted to carry wearing blocks 31, which blocks are adapted to engage the inner face of the wheel to prevent lateral displacement between the brake shoe mechanism and the wheel when the flanges 25 of the shoe are worn away. These blocks 31 are provided with lugs or projections 32 which are adapted to snugly engage in openings 33 in the ends of the guard plate 28. Between the blocks 31 and the guard plate 28 may be positioned a washer 34, such as is shown in Fig. 5, these washers being provided for the purpose of adjusting the wearing blocks 31 on the guard plate as the blocks become worn due to engagement with the face of the wheel.

The hooked projection 29 and the posts 27 go to make up a coupling and between these members is adapted to be inserted a key 35 which rests upon the posts 27 and beneath the hooked projection 29. The key 35 is suitably tapered so that lateral play or swinging movement of the guard is taken care of, and as the bearing blocks 31 are worn away, the key moves downwardly due to gravity, and thus the blocks are maintained against the side faces of the shoe flanges or the face of the wheel. The key 35 may be provided with a lug 36 to prevent the key from dropping through its key-way.

With the construction of guard above described, after the shoe is secured to its supporting member, that is the head H or the intermediate member I, the guard is swung about its pivot 30, and the inner faces of the bearing blocks 31 engage the faces of the shoe flanges. The guard is then locked in this position by inserting the key between the hooked projection 29 of the guard and the posts 27. The key 35, being tapered, will work down between the posts and the projection 29, in such manner that the bearing blocks are always maintained in close engagement with the shoe flanges. In case the brake shoe becomes displaced relative to the car wheel, and the flange of the wheel rides out of the grooves or channels provided in the shoe flanges 25, or when the latter flanges become totally worn away, the bearing blocks 31 of the guard engage the inner face of the wheel, and the shoe is maintained in correct alinement with the tread surface of the wheel.

In the embodiment of my invention disclosed in Figs. 10 to 14, I have shown the supporting member, in the present instance, the intermediate member I, as provided with a laterally extending curved or hooked projection 37, which projection may be bifurcated at its outer end. The inner face of the hooked end of projection 37 is provided with a groove 38 as shown in Fig. 14. In this embodiment of my invention, the guard plate comprises a slide 39 having on its outer face an integral rib or tongue 40, which rib is adapted to engage in the groove 38, as shown in Fig. 14. The plate 39 is provided with the apertures 33 for the reception of the lugs 32 of the bearing blocks 31. To prevent longitudinal displacement of the guard member relative to the supporting member, I provide the plate 39 with an opening 41 adapted to be brought into registry with an opening in the projection 37, so as to receive a bolt 42. The opening 41 terminates in a square recess 41', which is adapted to receive the square head of the bolt 42 as shown in Fig. 11, and the bolt is secured against displacement by lock nuts 42'.

In applying the guard plate 39 to the supporting member, the bolt 42 is removed; the end of the plate is brought into engagement with the projection 37 with the rib 40 engaging in the groove 38 of the projection; and the plate is slid longitudinally until the opening 41 is between the bifurcated ends of the projection 37. The bolt 42 is placed, from the inside of the plate, in the opening 41 with its head engaging in the recess 41', and its other end projecting through the opening in the projection 37 so as to receive the lock-nuts 42'.

It will be noted that my improved guard mechanism does not interfere with the positioning of the brake shoe upon its supporting member for in the embodiment shown in Figs. 1 to 9, the guard plate 28 is withdrawn from operative position by swinging the same outwardly, and in the embodiment shown in Figs. 10 to 14 the plate 39 is withdrawn by removing it.

Referring to the embodiment of my invention disclosed in Figs. 16 and 17, H' designates a brake head, and S' a brake shoe, the latter having a single keeper 16, and both the brake head H' and the shoe S' being the types now generally used in practice. I' designates a modified form of my intermediate member, and, in the present instance, comprises a curved plate 44 having a central transverse opening 45, the opening as shown in Fig. 16 being extended to each edge of the intermediate member. A rigid web or flange 46 is provided along each side of the plate and these webs form bridges for connecting the ends of the plate. If desired, the shoe S' may be provided with lugs 46' which engage in openings 44' of the intermediate member 44 for the purpose of preventing lateral displacement of the shoe upon the intermediate member.

As shown in Fig. 16, both the intermediate member I', and the shoe S' are secured to the brake head H' by means of a single locking member comprising, in the present case, the usual tapered pin, or key 14. The shoe may be inserted transversely of the head due to the transverse opening 45. One of the bridges or flanges 46 is provided with pivot posts 27 so that the intermediate member may be equipped with the guard mechanism shown in Figs. 1 to 8. No claim is herein made to the specific structure shown in Figs. 16 and 17, for I have filed a separate application Serial No. 138,206, filed December 21, 1916, covering this embodiment of my invention.

Referring now to the embodiment of my invention disclosed in Figs. 18 and 19, it will be noted that the brake shoe S' which, in the present instance, has a single keeper 16 is provided with a transverse ledge or rib 47 which lies within the keyway of the keeper 16. The shoe S' is secured to the head by means of the key 14.

E designates a shim plate comprising the forked yoke 48 and an arm or finger 49 having a hooked end 50. The equalizing plate E is of such construction that it is adapted to be positioned between the brake shoe and the brake head with the hook 50 engaging the rib 47 in the manner shown in Fig. 18, and the fingers or forked ends 48 interposed between the rear face of the brake shoe and the front edge of the walls of the brake head.

In Fig. 6 I have shown a shim plate E' somewhat similar to the shim plate just described applied to the intermediate member 15. It is understood that the keeper 16 of the intermediate member is provided with a rib similar to the rib 47 of the brake shoe S', and the fingers of the shim plate are interposed between the rear face of the intermediate member and the front face of the brake head.

In practice, when it has been found that the brake head has its front face eccentric to the periphery of the car wheel, the shim plate E may be interposed between the brake head and the shoe in the manner shown in Fig. 18, so that the wearing face of the shoe will engage, throughout its length, the periphery of the car wheel. If the lower end of the brake shoe is farther away from the periphery of the wheel than the top end, the shim plate is positioned as shown in Fig. 18, but, should it occur that the top end of the head is farther away from the periphery of the car wheel, than the lower end, then the shim plate is reversed, so that the upper portion of the brake shoe is blocked or spaced away from the front face of the brake head.

It is, of course, obvious that the structure shown and described herein is susceptible of various modifications and changes in form, proportion and arrangement of parts, which would be within the scope of the claims, without departing from the principle of the invention.

What I claim is:

1. In a brake shoe mechanism, a brake shoe supporting member, and a guard connected to said member and extending along one side thereof for engagement with a car wheel, said guard being capable of withdrawal from operative position.

2. In a brake shoe mechanism, a brake shoe supporting member, and a guard removably secured to said supporting member and adapted to engage a car wheel to prevent relative displacement between the brake shoe mechanism and the wheel.

3. In a brake shoe mechanism, a brake shoe supporting member, a brake shoe thereon, and a guard adapted to engage against one side of the brake shoe and extend beyond the wearing face thereof, said guard being adapted to be moved from engagement with said shoe to permit removal of the shoe from the head.

4. In a brake shoe mechanism, a brake shoe supporting member, and a guard thereon having wearing blocks adapted to engage a car wheel to prevent relative displacement between the wheel and the brake mechanism.

5. In a brake shoe mechanism, a supporting member, and a guard connected to said member and extending along one side thereof for engagement with a car wheel, said guard having removable wearing blocks for engagement with the wheel.

6. In a brake shoe mechanism, a guard adapted to engage a car wheel and comprising wearing blocks, and a plate having means for removably receiving said wearing blocks.

7. In a brake shoe mechanism, a brake shoe supporting member, and a guard connected to said member and comprising a plate having apertures adjacent its ends and wearing blocks having lugs adapted to be removably fitted in said apertures.

8. In a brake shoe mechanism, a guard adapted to engage a car wheel and comprising a plate, wearing blocks removably secured to said plate, and means for adjusting said wearing blocks upon said plate.

9. In a brake shoe mechanism, a guard adapted to engage a car wheel and comprising a plate having apertures adjacent its ends, removable wearing blocks having lugs adapted to be removably fitted in said apertures, and washers between said blocks and plates, said washers having openings adapted to receive said lugs.

10. In a brake shoe mechanism, a brake shoe supporting member, and a guard pivotally mounted on said supporting member and adapted for engagement with a car wheel to prevent lateral displacement between the brake shoe mechanism and the wheel.

11. In a brake shoe mechanism, a supporting member, a brake shoe thereon, and a guard pivotally secured to said member and adapted to engage the side of the brake shoe and extend beyond the wearing face thereof for engagement with the side of a car wheel.

12. In a brake shoe mechanism, a supporting member, a guard mounted on said supporting member and when in operative position adapted to extend beyond the front face of said member, and means for locking said guard in operative position.

13. In a brake shoe mechanism, a supporting member, a guard pivotally secured to said supporting member and in one position adapted to extend beyond the front face of said member, and means for locking said guard in operative position.

14. In a brake shoe mechanism, a supporting member, a guard adapted to engage a car wheel to prevent lateral displacement between the wheel and the brake shoe mechanism, and a coupling between said guard and brake shoe mechanism to permit the guard to be swung laterally away from said mechanism.

15. In a brake shoe mechanism, a brake shoe supporting member, a guard plate pivoted to said brake shoe supporting member and having a hooked projection, and a key adapted to engage beneath said hooked projection for locking said guard plate in operative position.

16. In a brake shoe mechanism, a brake shoe supporting member, pivot posts on said member, a guard plate having a hooked projection pivoted between said pivot posts, wearing blocks carried by said guard plate, and a key for locking said guard plate in operative position.

17. In a brake shoe mechanism, a brake shoe supporting member having a pair of pivot posts, a guard comprising a plate having a hooked projection pivotally mounted between said posts, and means adapted to rest upon said posts and extend beneath said hooked projection to lock the guard in operative position.

18. An intermediate member for brake shoe mechanism adapted to be attached to a brake head and to receive a brake shoe, said intermediate member comprising a plate having means for attaching the same to the head, and a pair of longitudinally spaced-apart slots in its body portion, said plate also having apertures along one side spaced apart to correspond to the position of said slots.

19. An intermediate member for brake shoe mechanism adapted to be attached to a brake head and to receive a brake shoe comprising a plate having a lug or keeper on its rear face, said plate having in its body portion a plurality of spaced-apart longitudinally extending slots, and apertures along one side, said apertures being spaced apart to correspond to the slots.

20. An intermediate member for brake shoe mechanism adapted to be attached to a brake head and to receive a brake shoe, said intermediate member comprising a plate having a centrally disposed keeper on its rear face, and a pair of spaced-apart slots in its body portion, said plate also having a flange along one side, and apertures through said flange, and a keyway on the rear face of said plate extending obliquely from said apertures across said slots.

21. In a brake shoe mechanism, the combination with a brake head, of an intermediate member adapted to be secured to the brake head and having slots therethrough and openings in its side, a brake shoe having lugs projecting into said slots, the lugs having lateral key-ways therethrough in registry with the side openings of said intermediate member, and a key extending through the openings and said key-ways to lock the shoe to said intermediate member.

22. In a brake mechanism, the combination with a brake head having the usual key-way and key, an intermediate member having a lug adapted to extend into the key-way, the lug having an opening adapted to register with said key-way of the head and through which the key is adapted to extend to lock the intermediate member to the head, said intermediate member also having slots therethrough and openings in one side, a brake shoe adapted to seat against the face of said intermediate member having lugs adapted to project into said slots, the lugs having lateral key-ways therethrough in registry with the openings in said intermediate member, and a second key extending through said openings and said second key-way to lock the shoe on said intermediate member.

23. In a brake shoe mechanism, the combination with a brake head, of an intermediate member having slots therethrough, spaced apart lugs adjacent the slots, and openings in said lugs, a brake shoe adapted to seat against the front face of said supporting member and having lugs adapted to project into said slots, the lugs having lateral key-ways in registry with the openings of the lug of said intermediate member, and a key adapted to be inserted through the openings into the key-ways to lock the shoe to the intermediate member.

24. In a brake mechanism, the combination with a brake head, of an intermediate member adapted to be attached to said brake head and having slots therethrough, said intermediate member also having spaced apart lugs at its side adjacent the corresponding ends of said slots and openings through said lugs, a brake shoe adapted to seat against the intermediate member and having lugs adapted to extend into the slots thereof, said lugs having key-ways extending obliquely downward and adapted to register with the openings in the lugs of the intermediate member, and a key member adapted to be inserted through said openings and into said key-ways to lock the shoe to the intermediate member.

25. In a brake mechanism, the combination with a brake head, of an intermediate member adapted to be attached to the brake head having slots therethrough and lugs at its side adjacent the corresponding upper ends of the slots, said lugs having openings therethrough and said member also having downwardly and inwardly extending grooves in its rear face leading from the openings and traversing said slots, a brake shoe adapted to seat against the front face of said intermediate member and having lugs projecting into said slots, the lugs having lateral key-ways therethrough in registry with said grooves, and a key extending through said openings, grooves and key-ways to lock the brake shoe to the intermediate member.

26. In a brake mechanism, the combination with a brake head, of an intermediate member adapted to be secured to the brake head and having slots therethrough and openings in its side, a brake shoe having lugs projecting into said slots, the lugs having lateral key-ways therethrough in registry with the side openings of said intermediate member, and a key extending through the openings and said key-ways to lock the shoe on said intermediate member, said intermediate member also having a central aperture for the reception of the keeper on the now generally used brake shoe.

27. In a brake mechanism, the combination with a brake head having a plurality of keepers, an intermediate member having a pair of keepers adapted to register with the keepers of said brake head, said intermediate member also having slots therethrough and openings in one side, a brake shoe adapted to seat against the face of said intermediate member having lugs adapted to project into said slots, the lugs having lateral key-ways therethrough in registry with the openings in said intermediate member, and a key extending through said openings and said key-ways to lock the shoe on the intermediate member, said intermediate member also having between the keepers thereof a central aperture adapted to receive the usual keeper of the now generally used brake shoe.

28. In a brake mechanism, a brake-shoe supporting member, a brake shoe, and a shim plate interposed between the shoe and member for adjusting the former at an angle to the latter.

29. In a brake mechanism, a brake shoe supporting member, a brake shoe, a shim plate removably connected to said brake shoe and adapted to be interposed between the shoe and the front face of the supporting member for adjusting the wearing face of the shoe eccentrically to the front face of the supporting member.

30. In a brake mechanism, a supporting member, a brake shoe mounted upon the front face of said supporting member and having a transverse rib, a shim plate adapted to be interposed between the supporting member and shoe, said shim plate having a hooked end for engagement about said rib.

31. In a brake mechanism, a brake head having a pair of keepers, a brake shoe having a single central keeper, a rib on the brake shoe within said keeper, a shim plate having a pair of fingers adapted to be interposed between the side walls of the brake head and the rear face of the brake shoe and a hooked end for engagement about said rib, and a key for securing said shoe to the head and said shim plate to the shoe.

In testimony whereof I have hereunto set my hand in presence of two subscribing witnesses.

CHARLES V. ROTE.

Witnesses:
H. EDGAR SHERTS,
NELLIE C. SHAY.

Copies of this patent may be obtained for five cents each, by addressing the "Commissioner of Patents, Washington, D. C."